R. J. FISHER & J. LICHTENBERGER.
CURTAIN-ROLLER.

No. 169,979. Patented Nov. 16, 1875.

WITNESSES
Jos. S. Coombs
T. M. Coombs

By

INVENTORS,
Robertson J. Fisher
James Lichtenberger
By A. S. Coombs,
Attorney

UNITED STATES PATENT OFFICE.

ROBERTSON J. FISHER AND JOHN LICHTENBERGER, OF FORT WAYNE, IND.

IMPROVEMENT IN CURTAIN-ROLLERS.

Specification forming part of Letters Patent No. 169,979, dated November 16, 1875; application filed October 23, 1875.

*To all whom it may concern:*

Be it known that we, ROBERTSON JAMES FISHER and JOHN LICHTENBERGER, both of Fort Wayne, in the county of Allen and State of Indiana, have jointly invented a new and useful Improvement in Spring - Roller for Window-Shades and other similar purposes, which improvement is fully set forth in the following specification, reference being had to the accompanying drawing.

The object of our invention is to produce a spring-roller for window-shades and the like, which will be more certain in its action, and less liable to get out of order, than any heretofore known or used.

Figure 1:
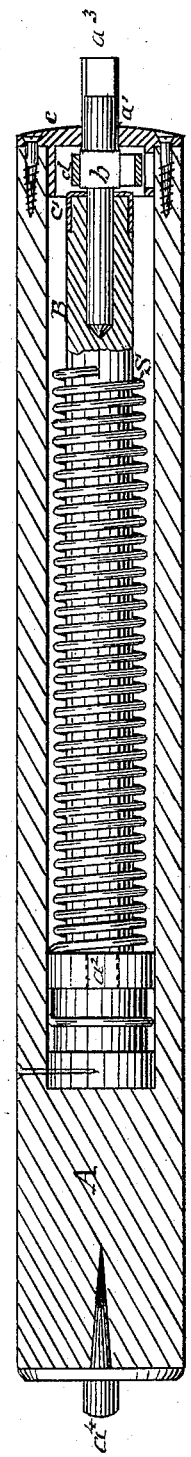
Figure 2:
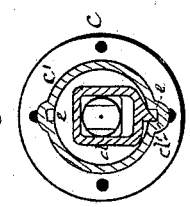

In the accompanying drawing, Figure 1 represents a longitudinal section of the roller, upon which the curtain or shade winds, and Fig. 2 a cross-section on line $x\ x$ of Fig. 1.

A is the rotating wooden roller, and B is the non-rotating spindle inserted in the roller A. S is a spiral spring, the inner end of which is secured to the interior of the roller A, or to a block inserted and made fast therein, and the outer end of which is made fast to the spindle B. The extreme outer end of the spindle at $a^3$ is made flat or square, and the socket in which it is inserted is of corresponding form, so that said spindle cannot rotate. A metal cap, $c$, with a central hole to receive the spindle, is fastened by screws or tacks to the spindle end of the roller A, having an annular flange, $c'$, extending down into the cavity of said roller. That part of the spindle $a^1$ which passes through said cap is cylindrical, and the hole in the cap is of corresponding form, so that the roller A can freely rotate upon said spindle, turning thereon at $a^1$ and $a^2$. Within the cup formed by the annular flange of the cap $c$ the spindle is square, as shown at $b$, and upon this part of the spindle there is a loose rectangular sleeve or collar, $d$, (shown clearly in Fig. 2,) with a pawl or catch, $d'$, on one of its sides. This sleeve or collar is of greater diameter on a line at right angles to the side on which the pawl or catch is than the square part of the spindle on which it is placed, so that it has sufficient play laterally upon said spindle to disengage the pawl from the notches or slots $e$ in the annular flange of the cap $c$, and it fits upon the spindle so loosely that the pawl will drop, by its own weight, into one of the notches or slots $e$, when it comes directly under said pawl or catch, if the roller be rotated somewhat slowly. The roller must be so placed in its bearings that the catch or pawl on the collar $d$ will be on the lower side thereof.

There may be one or two notches or slots in the annular flange of the cap $c$ to receive the pawl at every revolution or half-revolution of the roller.

The journal $a^4$ of the roller A is cylindrical, and its socket or bearing is of like form, so that it will freely rotate therein.

It will be seen that the spring and all the mechanism for locking and releasing it are completely inclosed within the roller, and consequently are not liable to be impaired or deranged by coming in contact with any outside object, and the pawl being upon the non-rotating spindle, and its catch in the rotating roller, the roller, when the spring is locked, may be removed from the bracket without releasing the spring.

The operation is as follows: The roller A, having been properly placed in its bearings, is rotated until the spring has attained a sufficient degree of tension, in which position it is locked by allowing the pawl to fall into its catch. Then a downward pull upon the curtain or shade will cause the roller to rotate and the curtain to unwind, so long as the pull is steadily continued. But if it be desired to stop the unwinding at any particular point, a little slacking up of the pull will cause the pawl to fall into its catch, when the latter comes directly under the pawl. A quick pull or jerk will release the pawl from its catch, and the spring will cause the roller to rotate in the direction to wind up the curtain, so long as the hold upon the curtain allows it to rotate somewhat rapidly; but if at any point the rotation is a little checked by a slight pull upon the curtain the pawl will fall into its catch, and so stop the further winding up of the curtain.

What we claim as our invention is—

The combination of the roller A, the spindle B, the spring S, the loose collar $d$, with its pawl, and the catch or catches $e$, when the spring, the loose collar and pawl upon the spindle, and the pawl-catch in the rotating roller are all inclosed within said roller, and are all constructed and arranged to operate substantially as described.

ROBERTSON JAMES FISHER.
JOHN LICHTENBERGER.

Witnesses:
THOS. D. PICKARD,
W. E. HOOD.